US010773446B2

(12) United States Patent
Bast et al.

(10) Patent No.: US 10,773,446 B2
(45) Date of Patent: Sep. 15, 2020

(54) APPARATUS FOR PRODUCING PLASTIC BOTTLES

(71) Applicant: SIDEL PARTICIPATIONS S.A.S., Octeville-sur-Mer (FR)

(72) Inventors: Tim Bast, Zug (CH); Roberto Zoni, Parma (IT)

(73) Assignee: SIDEL PARTICIPATIONS, Octeville-sur-mer (FR)

( * ) Notice: Subject to any disclaimer, the term of this patent is extended or adjusted under 35 U.S.C. 154(b) by 666 days.

(21) Appl. No.: 15/271,084

(22) Filed: Sep. 20, 2016

(65) Prior Publication Data

US 2017/0080625 A1    Mar. 23, 2017

(30) Foreign Application Priority Data

Sep. 21, 2015  (EP) .................................... 15306464

(51) Int. Cl.
*B29C 49/36*  (2006.01)
*B29C 49/28*  (2006.01)
(Continued)

(52) U.S. Cl.
CPC .......... *B29C 49/36* (2013.01); *B29C 49/4273* (2013.01); *B29C 49/78* (2013.01); (Continued)

(58) Field of Classification Search
CPC ..... B29C 49/36; B29C 49/78; B29C 49/4273; B29C 2949/78537; B29C 2949/78563;
(Continued)

(56) References Cited

U.S. PATENT DOCUMENTS

2002/0166640 A1* 11/2002 Caprara .................... B65C 3/26
156/556
2007/0163213 A1* 7/2007 Till ........................ B29C 49/20
53/471
(Continued)

FOREIGN PATENT DOCUMENTS

DE   10 2010 009137 A1   8/2011
EP        2295324 A1   3/2011
(Continued)

OTHER PUBLICATIONS

Extended European Search Report issued by the European Patent Office in counterpart European Patent Application No. 15306464.7, dated Mar. 4, 2016.

*Primary Examiner* — Nathaniel C Chukwurah
*Assistant Examiner* — Mobeen Ahmed

(57) ABSTRACT

An apparatus for producing plastic bottles comprising: a blow moulding machine including a blow moulding carousel being configured to transform a succession of plastic preforms into respective bottles; a filling machine including: a filling carousel, and a plurality of handling units; a labeling unit configured to feed a succession of labels to be attached to the respective bottles; and a conveying system configured to transfer the bottles within the apparatus. The labeling unit is arranged peripherally to the filling carousel and is configured to feed the labels to the handling units carrying the respective bottles while the handling units are advanced by the filling carousel. The conveying system includes a plurality of consecutive transport star wheels transferring the bottles in a continuous stream from the blow moulding carousel to the filling carousel.

19 Claims, 4 Drawing Sheets

(51) Int. Cl.
- *B67C 3/00* (2006.01)
- *B67C 3/08* (2006.01)
- *B67C 7/00* (2006.01)
- *B67C 3/24* (2006.01)
- *B65C 3/26* (2006.01)
- *B65C 9/08* (2006.01)
- *B29C 49/42* (2006.01)
- *B67C 3/12* (2006.01)
- *B65C 3/16* (2006.01)
- *B65C 9/04* (2006.01)
- *B67C 3/26* (2006.01)
- *B29C 49/78* (2006.01)
- *B29L 31/00* (2006.01)
- *B67C 3/22* (2006.01)

(52) U.S. Cl.
CPC .............. *B65C 3/16* (2013.01); *B65C 3/26* (2013.01); *B65C 9/04* (2013.01); *B65C 9/08* (2013.01); *B67C 3/007* (2013.01); *B67C 3/08* (2013.01); *B67C 3/12* (2013.01); *B67C 3/24* (2013.01); *B67C 3/2614* (2013.01); *B67C 7/002* (2013.01); *B67C 7/004* (2013.01); *B29C 2949/78537* (2013.01); *B29C 2949/78563* (2013.01); *B29L 2031/7158* (2013.01); *B67C 2003/227* (2013.01); *B67C 2003/2671* (2013.01)

(58) Field of Classification Search
CPC .......... B67C 7/004; B67C 3/007; B67C 3/08; B67C 3/12; B67C 3/24; B67C 7/002; B67C 3/2614; B67C 2003/227; B67C 2003/2671; B65C 3/26; B65C 9/04; B65C 3/16; B65C 9/08; B29L 2031/7158
See application file for complete search history.

(56) References Cited

U.S. PATENT DOCUMENTS

| | | | |
|---|---|---|---|
| 2009/0071104 A1* | 3/2009 | Fischer | A61L 2/22 53/426 |
| 2009/0127076 A1* | 5/2009 | Balboni | B29C 31/048 198/803.3 |
| 2010/0071830 A1* | 3/2010 | Putzer | B65C 9/40 156/64 |
| 2011/0056172 A1* | 3/2011 | Klenk | B29C 49/4273 53/268 |
| 2011/0109018 A1* | 5/2011 | Parrinello | B29D 22/003 264/524 |
| 2011/0121497 A1* | 5/2011 | Borgatti | B29C 49/421 264/523 |
| 2012/0100238 A1* | 4/2012 | Humele | B29C 49/28 425/90 |
| 2012/0187073 A1* | 7/2012 | Conforti | B67C 7/00 215/316 |
| 2012/0311962 A1* | 12/2012 | Hahn | B67C 3/007 53/281 |
| 2013/0115325 A1* | 5/2013 | Matteo | B29C 48/09 425/533 |
| 2013/0146421 A1* | 6/2013 | Zoni | B65G 29/00 198/608 |
| 2013/0153150 A1* | 6/2013 | Pace | B29C 9/1815 156/361 |
| 2014/0318083 A1* | 10/2014 | Marastoni | B29C 49/4273 53/453 |
| 2015/0284115 A1* | 10/2015 | Voth | B65B 31/022 53/453 |
| 2016/0194189 A1* | 7/2016 | Zoni | B67C 3/242 141/1 |
| 2016/0214803 A1* | 7/2016 | Armellin | B65G 47/847 |
| 2017/0015540 A1* | 1/2017 | Zoni | B67C 3/225 |

FOREIGN PATENT DOCUMENTS

| | | |
|---|---|---|
| EP | 2889229 A1 | 7/2015 |
| WO | WO 2014/102075 A1 | 7/2014 |

\* cited by examiner

APPARATUS FOR PRODUCING PLASTIC BOTTLES

CROSS-REFERENCE TO RELATED APPLICATIONS

This application claims the benefit of priority of European Patent Application No. 15306464.7, filed on Sep. 21, 2015, which is incorporated herein by reference.

TECHNICAL FIELD

The present invention relates to an apparatus for producing plastic bottles; in particular, the present invention relates to an apparatus, in which the plastic bottles are formed from blanks or preforms, filled with pourable products, labeled and preferably capped.

The products poured in the bottles include still (such as still water) or carbonated liquids (such as sparkling water, soft drinks and beer), beverages (including juices, teas, sport drinks, wine, etc.), liquid cleaners, emulsions, suspensions, high viscosity liquids, etc.

It is pointed out that the term "plastic bottle" is used in the present description and in the claims to indicate any type of plastic container which is obtained by a blow moulding process starting from a blank or preform.

BACKGROUND ART

As known, a wide range of plastic bottles are formed in carousel-type blow moulding machines from plastic preforms. In particular, the heated preforms are accommodated in correspondingly designed blow moulds of the blow moulding machine and are then blown, during rotation of the blow moulding machine, under high pressure and high temperature to form respective bottles.

The bottles exiting from the blow moulding machine are then transferred to a carousel-type filling machine, where such bottles are filled with a pourable product of the above-mentioned type. At this point, the bottles are capped in a further carousel and subsequently transferred to a labeling machine. It is often necessary to provide a long transfer from the capping machine to the labeling machine to allow the bottles to be externally dried prior to proceed with the application of the labels.

In general, in the known apparatuses, there are long transfer paths between the above-indicated different machines, partly also with interposition of buffers; as a consequence, facilities suitable to house this kind of apparatuses need to be relatively extensive, i.e. they require a lot of space.

A need is particularly felt in this field to reduce the footprint of the apparatuses for producing, filling, capping and labeling plastic bottles.

A solution to this problem has been proposed in US 2011/0056172, wherein the labeling machine has been interposed between the blow moulding machine and the filling machine, so that no drying operation is required prior to start the labeling operation, as the bottles exit perfectly clean and dry from the blow moulding machine. However, it is necessary to provide a change of pitch from the blow moulding machine to the labeling machine.

In addition, in the proposed solution of US 2011/0056172, the bottles are transferred without buffers among the blow moulding machine, the labeling machine and the filling machine.

This recently-proposed solution still leaves room for further improvements, especially as to achieve a further reduction of the apparatus footprint and a simplification of the adjustments necessary to synchronize the different processing machines.

DISCLOSURE OF INVENTION

It is an object of the present invention to provide an apparatus for producing plastic bottles, designed to meet the above needs, and which is cheap and easy to implement.

According to the present invention, there is provided an apparatus for producing plastic bottles as claimed in claim 1.

BRIEF DESCRIPTION OF THE DRAWINGS

A preferred embodiment is hereinafter disclosed for a better understanding of the present invention, by mere way of non-limitative example and with reference to the accompanying drawings, in which.

BEST MODE FOR CARRYING OUT THE INVENTION

Figure 1:
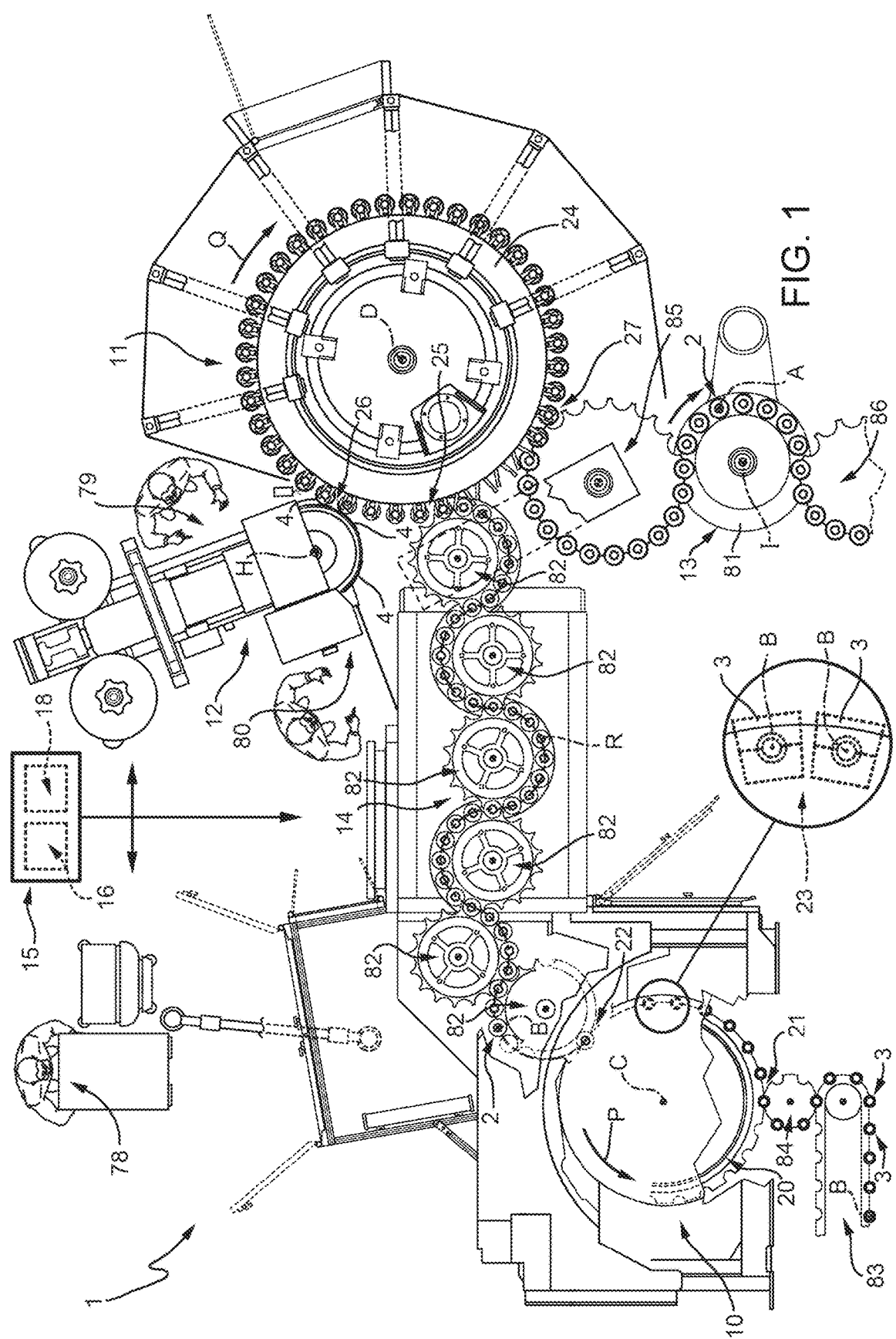
FIG. 1 shows a schematic top plan view, with parts removed for clarity, of an apparatus according to the present invention for producing plastic bottles.
Figure 2:
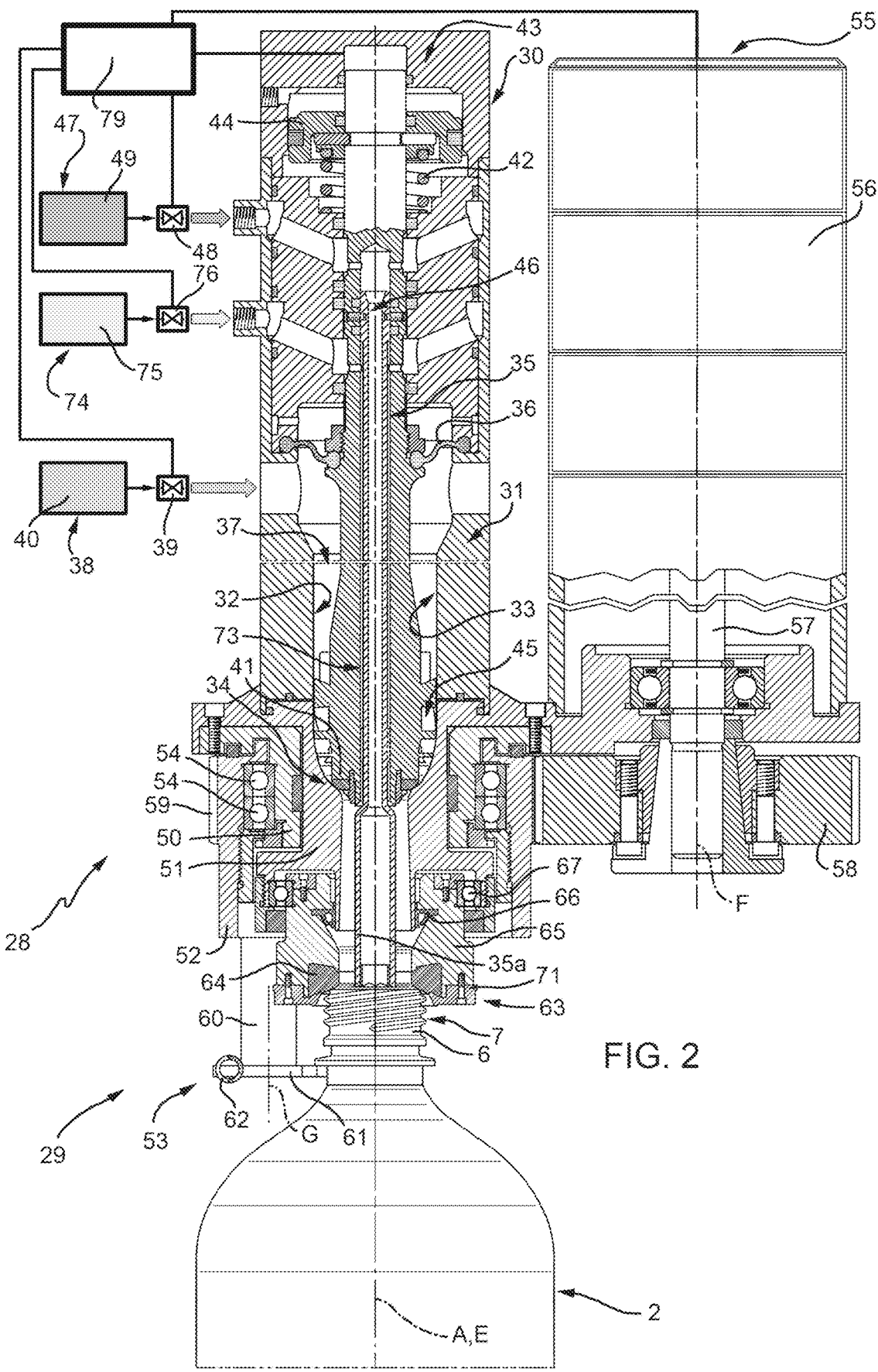
FIG. 2 shows a larger-scale, partly sectioned side view, with parts removed for clarity, of a handling unit of a machine of the FIG. 1 apparatus.
Figure 3:
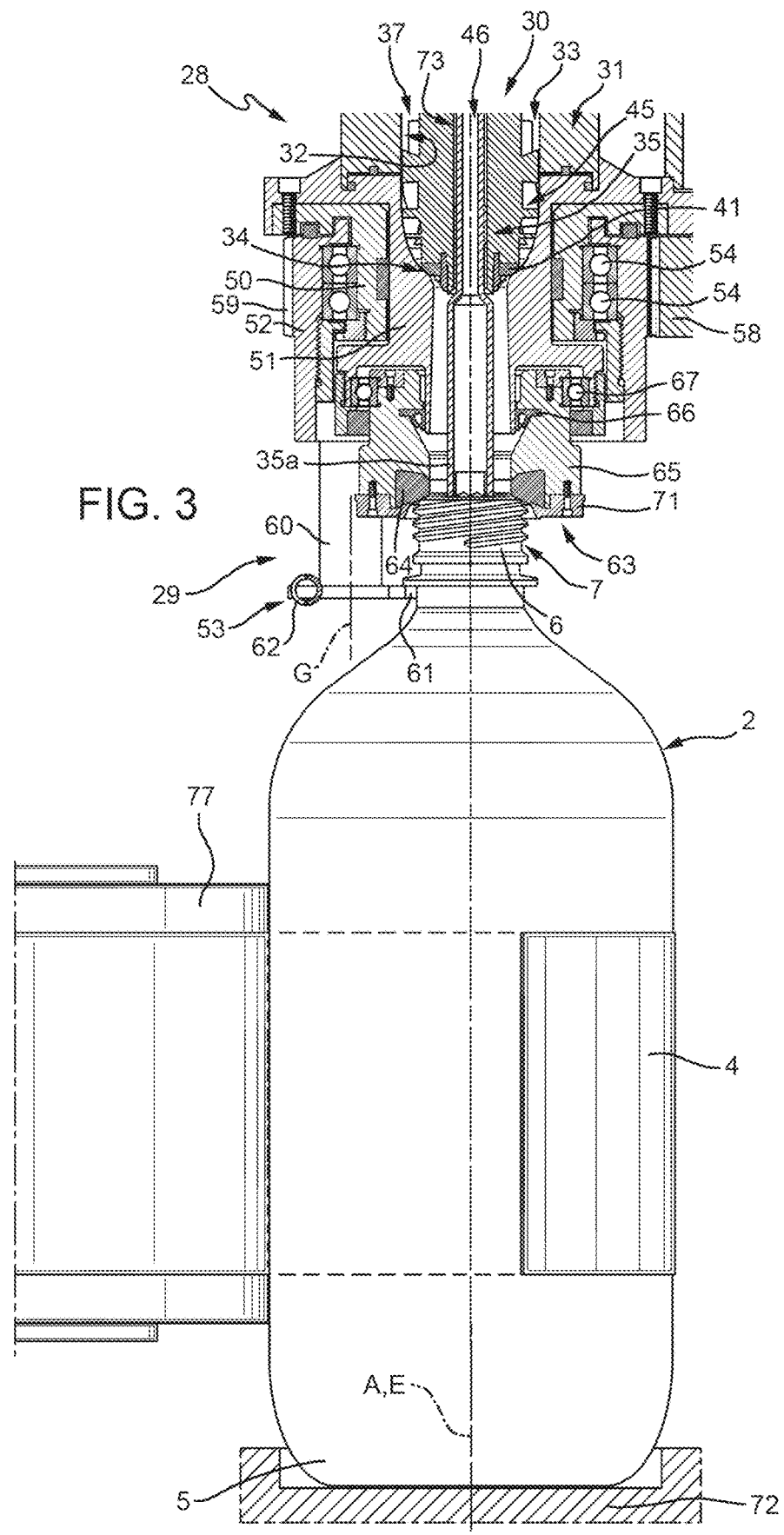
FIG. 3 shows part of the handling unit of FIG. 2 during a different operative step.
Figures 4, 5:
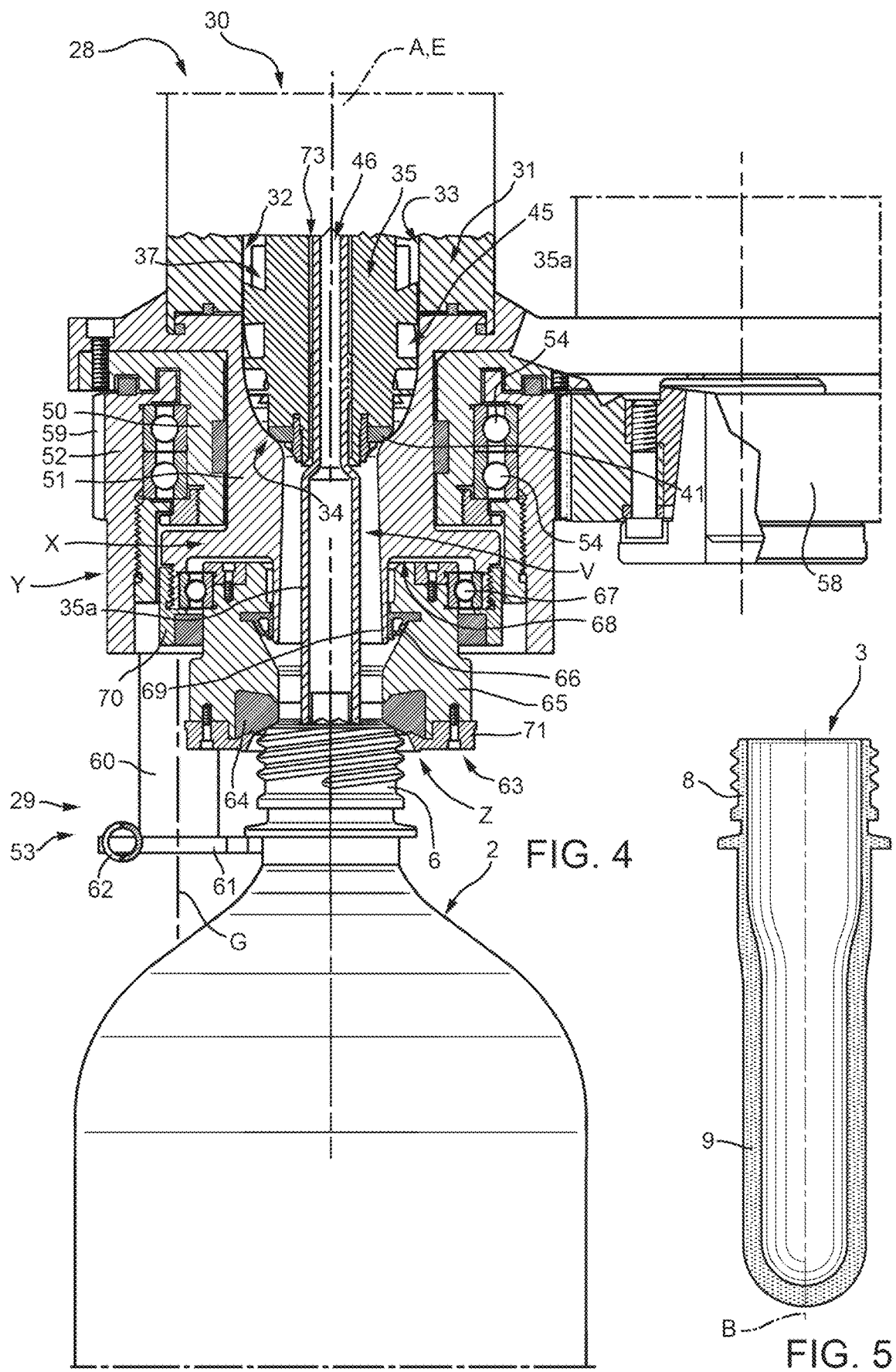
FIG. 4 shows a larger-scale, sectioned side view, with parts removed for clarity, of a detail of the handling unit of FIGS. 2 and 3.
FIG. 5 shows a front sectioned view of an example of preform from which the apparatus of FIG. 1 produces the bottle illustrated in FIGS. 2 to 4.

Number 1 in FIG. 1 indicates as a an apparatus according to the present invention for producing plastic bottles 2 (shown in greater details in FIGS. 2 to 4).

In particular, in the apparatus 1, the bottles 2 are formed from respective preforms 3 (FIG. 5), are filled with a pourable product, are capped with respective known closing caps (not shown) and are labeled with respective labels 4 (FIG. 3).

The bottles 2 used in apparatus 1 may be filled with any type of pourable product, like carbonated liquids (such as sparkling water, soft drinks and beer), non-carbonated liquids (such as still water, juices, teas, sport drinks, wine), liquid cleaners, emulsions, suspensions, high. viscosity liquids, powder products, etc.

As visible in FIGS. 1 to 4, each bottle 2 has a longitudinal axis A, which runs in a vertical direction within. apparatus 1. Each bottle 2 is bounded at the bottom by a bottom wall 5, substantially perpendicular to axis A, and has a top neck 6 substantially coaxial with the axis itself and defining an inlet/outlet. mouth; the neck 6 is preferably equipped with a threaded surface 7 designed to allow the closing off by capping of the final bottle 2.

In the preferred embodiment shown in FIG. 5, each preform 3 is made from thermoplastic material and comprises a top neck 8, which is at its definitive shape identical to that of the neck 6 of the corresponding bottle 2, and a wall 9 bounding an internal closed volume only accessible through the mouth of the neck 8.

In particular, each preform 3 has a main longitudinal axis B, which runs in a vertical direction within apparatus 1. The wall 9 of each preform 3 has a U-shaped cross section in a plane containing the relative axis B. A part of the wall 9, opposite neck 8, defines, in the vertical direction, the bottom of the preform 3 destined to be transformed, during production of the relative bottle 2, into bottom wall 5 thereof.

With reference to FIG. 1, apparatus 1 comprises:
a blow moulding machine 10 configured to transform a succession of preforms 3 into respective bottles 2;
a filling machine 11 configured to introduce a predetermined volume of a pourable product into each bottle 2;
a labeling unit 12 configured to feed a succession of labels 4 to be attached to the respective bottles 2;
capping machine 13 located downstream of filling machine 11 and configured to provide bottles 2 with relative closing caps after filling; and
a conveying system 14 configured to transfer the bottles 2 within the apparatus 1.

Apparatus 1 also comprises a central electronic control system 15, which in turn includes:
an electronic process control unit 16 for monitoring and controlling the operations of blow moulding machine 10, filling machine 11, labeling unit and capping machine 13 as well as the various components of conveying system 14; and
a power supply unit 18 for supplying electrical power to any member of the apparatus 1.

Blow moulding machine 10, filling machine 11 and capping machine 13 are all of carousel-type.

In particular, blow moulding machine 10 comprises a blow moulding carousel 20, which is mounted to rotate continuously (anticlockwise in FIG. 1) about a vertical axis C perpendicular to the FIG. 1 plane. The carousel 20 receives a succession of preforms 3 at an input station 21 and releases a succession of bottles 2 at an output station 22, angularly spaced from the input station 21 about axis C.

Blow moulding machine 10 further comprises a plurality of moulding units 23 (known per se and only schematically shown in FIG. 1), which are equally spaced angularly about axis C, are mounted along a peripheral portion of carousel 20 and are moved by the carousel 20 itself along a transfer path P extending about axis C and through input and output stations 21 and 22.

Each moulding unit 23 is configured to receive the respective preform 3 with its axis B parallel to the axis C as well as to transform the preform 3 itself into a respective bottle 2. More specifically, each moulding unit 23 includes, in a known manner, injecting means (not shown) for introducing a fluid under pressure in the respective preform 3 through its neck 8 so as to deform the wall 9 up to the final shape of the bottle 2. The preforms 3 are previously heat treated in an oven (known per se and not shown) in order to soften the material composing them prior to be subjected to the actual blow moulding operations on the carousel 20.

With reference to FIGS. 1 to 4, filling machine comprises a filling carousel 24, which serves not only to fill the bottles 2 with the pourable product but also to label them with the respective labels 4 fed by labeling unit 12.

Carousel 24 is mounted to rotate continuously (clockwise in FIG. 1) about a vertical axis D, parallel to axis C. The carousel 24 receives succession of empty bottles 2 at a first input station and a succession of labels 4 at a second input station, arranged downstream and angularly spaced from the input station 25 about the axis D; the carousel 24 releases a succession of filled and labeled bottles 2 at an output station 27, angularly spaced from the input stations 25, 26 about axis D and arranged downstream thereof.

Filling machine 11 also comprises a plurality of handling units 28, which are equally spaced angularly about axis D, are mounted along a peripheral portion of carousel 24 and are moved by the carousel 24 itself along a transfer path Q extending about axis D and through stations 25, 26 and 27.

As shown in detail in FIGS. 2 to 4, each handling unit 28 comprises a support device 29 configured to receive and retain a relative bottle 2 in a vertical position, in which such bottle 2 has its axis A parallel to the axis D of carousel 24, and a filling device 30 selectively operated to feed the pourable product into the bottle 2 itself as the support device 29 travels along transfer path Q.

Each filling device 30 is conveniently arranged above the bottle 2 to be filled and each support device 29 projects downwards from the relative filling device and supports the bottle 2 itself in a suspended position.

As the handling units 28 are completely identical to each other, only one will be described in detail hereafter, for the sake of clarity and simplicity.

With particular reference to FIGS. 2 to 4, filling device 30 comprises a vertical hollow post 31 with a cylindrical shape, which has a longitudinal axis E, parallel to axis D, and is fixed to the peripheral portion of the carousel 24.

Post 31 is radially delimited by an inner surface comprising an upper wide portion 33 and a lower narrow portion 34, and is engaged in a sliding manner by a shutter 35 with a tubular shape, which is mounted inside the post 31 coaxial to the axis E.

Shutter 35 projects downwards from a lower opening of post 31, and is coupled to the latter by means of a deformable annular membrane 35, which is in turn interposed between the post 31 and the shutter 35 themselves.

Shutter 35 defines, together with post 31, an annular feeding conduit 37, which extends between post 31 and shutter 35 and is connected, through a product circuit 38 (known per se and only schematically shown) and an ON/OFF valve 39, to a tank 40 (also known per se and schematically shown) containing the pourable product to be fed into the bottles 2.

Shutter 35 is provided, on its outer surface, with an annular elastomeric gasket 41 configured to cooperate in use with lower narrow portion 34 of inner surface 32 of post 31; shutter 35 also has a lower tubular end portion 35a extending downwards coaxially with axis E from the portion provided with gasket 41.

Shutter 35 is axially movable between a lowered closing position (FIGS. 2 to 4), in which gasket 41 of the shutter 35 is arranged in contact with lower narrow portion 34 of inner surface 32 of post 31 so as to be coupled to the latter in a fluid-tight manner and close conduit 37, and a raised opening position (not shown), in which the conduit 37 itself is open.

Shutter 35 is moved to its raised opening position—and normally kept there—by a spring 42, which is mounted between the post 31 and the shutter 35 coaxial to axis E, and is moved to its lowered closing position, against the action of the spring 42, by an actuating cylinder 43.

More specifically, actuating cylinder 43 is arranged within post 31 coaxial to axis E, is provided with a piston 44, which is coupled to shutter 35 in an axially and angularly fixed manner, and is connected to a known pneumatic device, which is not shown.

By setting valve 39 in an open condition and shutter 35 in the raised opening position, the pourable product can flow within the relative bottle 2 so as to define a filling operation thereof.

Shutter 35 also has a swirler 45, which is obtained on the outer surface of the shutter 35 itself, and extends along—and around—axis E, so as to cause the pourable product fed along conduit 37 to have a swirling movement.

Shutter 35 defines an inner feeding conduit 46, which is connected, through a pressurization circuit 47 (known per se and only schematically shown) and an ON/OFF valve 48, to a chamber 49 (also known per se and schematically shown) formed in the carousel and filled with a pressurization fluid, e.g. carbon dioxide.

By setting valve 48 in an open condition, it is possible to pressurize the relative bottle 2 carried by the handling unit 28 to a given pressure value higher than the atmospheric pressure. This pressurizing step serves to two purposes:

to make each bottle 2 sufficiently rigid for a labeling operation, which. is carried out on the same carousel 24 and will be described in detail later on; and in case of a filling operation to be performed with carbonated product with or without a labeling operation, to take each bottle 2 to the requested condition for filling.

It is pointed out that the pressure values required for filling a bottle 2 with a carbonated product may be different and in particular higher than the pressure values required only to make the bottle 2 sufficiently rigid for a labeling operation.

Filling device 30 also comprises a tubular element 50, which extends around a lower end 51 of post 31, is mounted coaxial to axis E, and is coupled to the post 31 itself in an angularly and axially fixed manner.

Support device 29 comprises a substantially cylindrical support bell 52 of axis E, which is externally coupled to tubular element 50 in an axially fixed position and in a rotary mariner about the axis E itself, and a gripping member 53 projecting downwards from the bell 52 and configured to retain a relative bottle 2 by the neck 6.

In particular, bell 52 extends coaxially around tubular element 50. More specifically, bell 52 is coupled to tubular element 50 by interposing one or more rolling bearings 54, two in the example shown, so as to rotate around axis E relative to the tubular element 50 itself and under the thrust of an actuating device 55, in turn extending on one side of filling device 30.

As clearly visible in FIG. 2, actuating device 55 comprises an electric motor 56, which is fixed to the carousel 24 on one side of post 31, and is provided with an output shaft 57 having a longitudinal axis F that is parallel to axis E.

Shaft 57 is coupled to bell 52 by means of a pair of gears 58, 59, one of which (58) is angularly secured to the shaft 57 and the other (59) is formed on the outer surface of the bell 52 itself.

Gripping member 53 comprises a support arm 60, which projects downwards from bell 52, is fixed to the bell 52 itself and supports a pair of holding jaws 61, which are configured to hold a relative bottle 2 in correspondence to its neck 6.

In particular, support arm 60 projects from a. bottom surface of bell 52 in an eccentric position with respect to axis E.

Jaws 61 are mounted under arm 60 and are hinged to the arm 60 itself so as to rotate, relative to the latter, around a fulcrum axis G, which is parallel to axis E.

Jaws 61 are normally set in a clamping position under the thrust of a spring 62, which is interposed between the jaws 61 themselves; in use, laws 61 are moved to a release position by the thrust exerted thereon by the relative bottle 2 during its insertion into gripping member 53 or its extraction from the gripping member 53.

Filling device 30 also comprises a filling head 63, axially projecting downwards, i.e. towards the relative jaws 61, from post 31 and with respect to the relative bell 52, and further comprising an annular elastomeric gasket 64, which has an annular shape coaxial to axis E, is designed to cooperate, in use, with top neck 6 of the relative bottle 2 and is carried by post 31.

In particular, the gasket 64 is secured to an annular element 65, in turn cooperating with lower end 51 of the relative post 31 through a further elastomeric gasket 66 and a rolling bearing 67.

In particular, lower end 51 of the relative post 31 defines at the bottom, i.e. towards the relative jaws an annular cavity 68, open towards the jaws 61 themselves and delimited by an inner annular wall 69 and an outer annular wall 70; in greater details, inner annular wall 69 delimits, on its outer side, the annular cavity 68, and, on its inner side, the conduit 37; outer annular wall 70 outwardly faces bell 52.

Annular element 65 is housed within annular cavity 68 and cooperates with inner annular wall 69 of post 31 through. gasket 66 and with outer annular wall 70 through rolling bearing 67.

The gasket 64 of each handling unit 28 is sandwiched between annular element 65 and an annular disk-shaped cover 71, secured to the annular element 65 itself.

As a result of the arrangement above described, annular element 65, gaskets 64, 66 and cover 71 can rotate in use with respect to post 31 around axis E under the thrust of the relative bottle 2. During this rotation, gasket 66 slides on inner annular wall 69 of the relative post 31 ensuring sealing thereof.

As clearly shown in FIGS. 2 to 4, in each handling unit 28, gasket 66 is axially interposed between the gasket 64, destined to cooperate with the relative bottle 2, and the gasket 41 of the shutter 35 cooperating with lower narrow portion 34 of inner surface 32 of the post 31 in the lowered closing position of the shutter 35 itself.

Support device 29 of each handling unit 28 may additionally comprise a lower support plate 72 (FIG. 3), on which bottom wall 5 of the relative bottle 2 rests.

According to another possible embodiment not shown, gripping members 53 may be removed and lower support plates 72 may be motor-operated so as to rotate the respective bottles 2 around the relative axes E; in this case, the rotary motion imparted to each bottle 2 by the respective lower support plate 72 would be transmitted to the relative filling head 63 by means of the bottle 2 itself.

As shown in FIGS. 2 to 4, post 31 further defines an annular decompression conduit 73 connecting an annular volume V, formed between lower end 51 of the post 31 and lower end portion 35*a* of shutter 35, with a decompression circuit 74 (known per se and only schematically shown), in turn connected to a discharge device 75 (also known per se and only schematically shown) through an ON/OFF valve 76.

As a result of the described structure, each handling unit 26 is configured not only to support and fill a relative bottle 2 but also to rotate such bottle 2 about its axis A during its movement along transfer path Q together with carousel 24. This kind or rotary motion is imparted to each bottle 2 by electric motor 56 and gripping member 53 of the relative handling unit 28.

In practice, each bottle 2 has, in use, a revolution motion about axis D together with carousel 24 and a rotary motion about its own axis A as a result of the torque imparted by the relative electric motor 56 and gears 58, 59 to the relative gripping member 53.

In this way, the post 31 and the tubular element 50 define a fixed portion X of the relative handling unit 28, whilst the bell 52 and the gripping member 53 define an active rotary portion Y of the handling unit 28 itself, capable of imparting a rotary motion to the relative bottle 2; in addition, the gaskets 64, 66, the annular element 65 and the cover 71 define a passive rotary portion Z of the relative handling unit 28 as such components are dragged into rotation in use by the relative bottle 2.

With reference to FIGS. 1 and 3, labeling unit is arranged peripherally to carousel 24 and is configured to feed the labels 4 to the respective handling units 28 carrying the respective bottles 2, while such units 28 are advanced along transfer path Q by the carousel 24 and pass by the labeling unit 12 itself.

As visible in FIG. 1, labeling unit 12 cooperates with carousel 24 at input station 26, which is preferably arranged closer to input station 25 than output station 27.

In the embodiment shown in FIG. 1, labeling unit 12 is arranged adjacent to a first sector of the carousel 24, immediately downstream of the position at which the bottles 2 are fed to the carousel 24 itself by the conveying system 14, i.e. immediately downstream of input station 25.

With particular reference to the embodiment shown. in FIGS. 1 and 3, labeling unit 12 preferably comprises a label transfer drum 77 carrying the labels 4 on its outer lateral surface by suction and rotating about an axis H, parallel to axes C, D, E, F. More specifically, the drum 77 is arranged tangentially to carousel 24 so as to transfer each label 4 to the adjacent bottle passing by the drum 77 itself.

In order to allow application of each label 4 on the corresponding bottle 2, the latter is rotated about its axis A by switching electric motor 56 to an active state.

As it will be explained in greater detail hereafter, the application of each label 4 on the corresponding bottle 2 is performed after pressurization of such bottle 2 by opening valve 48 of the relative pressurization circuit 47.

With reference to FIG. 1, blow moulding machine 10, filling machine 11 and labeling unit 12 have respective control panels 78, 79, 80, which are configured to control the operations performed by said machines and labeling unit, are connected to electronic process control unit 16 and are electrically powered by power supply unit 18.

With particular reference to FIG. 2, control panel 79 of filling machine 11 is connected to electric motor 56, piston 44 and ON/OFF valves 39, 48 and 76 of each handling unit 28, Control panel 79 is configured to set each electric motor 56 in the active state in order to rotate the relative gripping member 53 supporting a relative bottle 2 during labeling and filling thereof with the pourable product.

Angular speed imparted to each bottle 2 during application of one relative label 4 is preferably higher than that imparted to the same bottle 2 during filling with the pourable product, In order to obtain rotation of each bottle 2 during filling thereof with the pourable product, control panel simultaneously maintains the shutter 35 of the relative handling unit 28 in the upper opening position, the relative valve 39 in the open condition and the relative electric motor 56 in the active state, so as to rotate the relative gripping member 53 about the respective axis E.

By rotating each bottle 2 about its axis A while the same bottle 2 is filled with the pourable product by the relative filling device 30 and is transported in a revolution motion along transfer path Q by carousel 24, it is possible to obtain the following effects:

the centrifugal force caused by this double rotation generates an additional pressure on the pourable product in the bottle 2, which entraps the carbon dioxide into the product; and the pourable product comes down into the bottle 2 along the lateral wall thereof instead of centrally.

Both these effects permits to obtain a significant reduction in the formation of foam at the end of the filling operation.

Control panel 79 is advantageously configured to switch each electric motor 56 to the active state so as to rotate the relative gripping member in turn supporting a relative bottle 2, during the decompression step, i.e. while such bottle 2 is put in connection, by opening the relative valve 76, with the discharge device The applicant has observed that this further rotation imparted to each bottle 2 during the decompression step permits to obtain a further significant reduction in the formation of foam when the bottle 2 itself is released at atmospheric pressure.

The rotation speeds of each gripping member 35 and the respective bottle 2 during the decompression step are progressively reduced to stop at the end of such step.

All the variations in the angular speeds of each gripping member 35 and the respective bottle 2 during filling and decompression are controlled by control panel 79 through suitable commands imparted to the relative electric motor 56.

With reference to FIG. 1, capping machine 13 is of known type and basically comprises a capping carousel 81, which serves to cap the filled bottles 2 with respective closing caps and which is mounted to rotate continuously (clockwise in FIG. 1) about a vertical axis I, parallel to axis C, D, F, F and H.

Capping machine 13 further comprises, in a known manner, a panel control (not shown), which is configured to control the operations performed by such machine, is connected to electronic process control unit 16 and is electrically powered by power supply unit 18.

With reference to FIG. 1, conveying system 14 advantageously comprise a plurality of consecutive transport star wheels 82 having respective axes parallel to axes C, D, F, F, H, I and configured to transfer the bottles 2 in a continuous stream from the carousel 20 to the carousel 24.

The star wheels 82 define a given flow line H, along which the bottles 2 are advanced from carousel 20 to the carousel 24. The flow line R is formed by a plurality of arc-shaped segments, each of which having a concavity opposite to the adjacent one/ones.

As clearly visible in FIG. 1, the distance between the carousels 20 and 24 is only defined by the number of star wheels 82 interposed therebetween, without further processing carousels.

The star wheels 82 are advantageously in an even number, preferably equal to six in the example shown. In this way, the carousels 20 and 24 have opposite directions of rotation. This feature together with the fact that the labeling unit 12 is arranged adjacent to a first sector of the carousel 24 immediately downstream of input station 25 make possible to have the control panels 78, 79, 80 located on the same side with respect to flow line R, so as to facilitate installation of the apparatus 1, without any need of operators to pass from one side to the opposite one of the apparatus itself.

Conveying system 14 further comprises a linear conveyor 83 and an input star wheel 84 for feeding the preforms 3 to carousel 20; in particular, star wheel 84 cooperates with carousel 20 at input station 21.

Conveying system 14 finally comprises one star wheel 85 for transferring the filled and labeled bottles 2 from carousel 24 to carousel 81, and one star wheel 86 for removing the capped bottles 2 from the carousel 81.

As shown in FIG. 1, carousel 81 is advantageously arranged on the opposite side of flow line R with respect to labeling unit 12.

Operation of apparatus 1 will now be described with reference to one preform 3 and as of the instant in which such preform 3 is fed to blow moulding machine 10 in order to be transformed into a corresponding bottle 2 destined to be subsequently labeled, filled with a pourable product and capped.

In particular, the preform 3, preheated in an oven prior to reaching the input station 21, is fed to the carousel 20 by star wheel 84 in a vertical position, i.e. having its axis B parallel to axes C, D, E, F, H, I and its neck 8 located on top of the preform 3 itself. More specifically, the preform 3 is received in respective moulding unit 23 of blow moulding machine 10 to be transformed in a corresponding bottle 2 by injecting a fluid under pressure in the cavity delimited by wall 9 so as to deform such wall to the desired final configuration.

The bottle 2 obtained by the blow moulding operation carried out on the preform 3 is then fed to the adjacent star wheel 82 at output station 22. The bottle 2 is advanced continuously towards the filling machine 11 by the consecutive star wheels 82 in a vertical position, i.e. with its axis A parallel to axes C, D, E, F, H, I and its neck 8 located in an upper position than its bottom wall 5.

The bottle 2 is received by a respective handling unit 28 at input station 25 of carousel 24. in particular, the bottle 2 is retained at its neck. 6 by the respective gripping member 53 and supported at the bottom by the respective lower support plate 72. More specifically, the gasket 64 of the relative filling head 63 contacts the neck 6 of the bottle 2, which has a position coaxial with the filling head 63 itself and, more in general, with the handling unit 28. In practice, the axis A of the bottle 2 is coaxial with the axis F of the handling unit 28.

At this point, valve 48 of pressurization circuit 47 is opened (valve 39 of product circuit 38 and valve of decompression circuit 74 are in a closed condition) and is maintained in that condition up to the moment in which pressure in the bottle 2 reaches a given first value H1, for instance about 1,5 bar, adapted to make the bottle 2 sufficiently rigid for labeling. Then, valve 48 is closed.

In the meantime, the handling unit 28 reaches input station 26, where a label 4 is supplied by labeling unit 12 to the bottle 2; in order to allow application of the label 4 on the bottle 2, the latter is rotated about its axis A by activating electric motor 56, in particular, in this stage, rotary motion imparted by output shaft 57 of electric motor 56 to gripping member 53 through gears 58, 59 is transmitted to the bottle 2 and from the latter to the passive rotary portion Z of the handling unit 28, which is in contact with the neck. 6 of the bottle 2.

Once the label 4 has been applied on bottle 2, in the case in which the pourable product to be fed into the bottle 2 is carbonated liquid, a further pressurization step is carried out; even in this case, valve 48 of pressurization circuit 47 is opened and maintained in the open condition up to the moment in which pressure in the bottle 2 reaches a given second value H2, for instance about 6 bar, higher than first value H1 and defining the requested condition for the filling operation with the carbonated liquid. Then, the valve 48 is again closed.

By opening valve 39 of product circuit 38, the actual filling of the bottle 2 with the product can be started (shutter 35 is normally kept by spring 42 in the raised opening position). This step ends when the product reaches the desired level in the bottle 2.

During this step, electric motor 56 is again activated to rotate the bottle 2 about its axis A. Therefore, the bottle 2 is subjected to a revolution motion about axis D and a rotary motion about axis A. Thanks to this double rotation about axes A and D, the bottle 2 can be filled at high speed with a reduced formation of foam. As a matter of fact, the centrifugal force caused by this additional rotation about axis A generates an additional pressure on the product in the bottle 2, which entraps the carbon dioxide into the product. Moreover, the product comes down into the bottle along the lateral wall thereof instead of centrally.

The next step is the decompression of the bottle 2, which is achieved by connecting the bottle 2 with decompression circuit 74.

Also in this step, the bottle 2 is rotated about its axis A, by maintaining electric motor 56 in an activation step. In particular, during the decompression step, the bottle 2 is progressively decelerated and is definitively stopped at the end of this step.

The applicant has observed that, by rotating the bottle 2 during the decompression step, further reduction of the formation of the foam can be achieved with a consequent relevant reduction of the overall time to complete the filling operation of the bottle 2.

In the case in which the pourable product delivered to the bottle 2 is a non-carbonated liquid, the second pressurization step is not performed.

Once the filling operation has been completed, the bottle 2 is released. by carousel 11 to star wheel 85 at output position 27 and then transferred to the carousel of capping machine 13 for performing the capping operation. The bottle 2 finally reaches star wheel 86 to be subsequently transferred to the next processing stations.

The advantages of apparatus 1 according to the present invention will be clear from the foregoing description, In particular, the apparatus 1 allows to perform the blow moulding, filling, labeling and cape operations by using only three carousel-type machines. In addition, the transfer from one machine to the next is achieved by using consecutive star wheels, without buffers or further processing means so as to move the bottles 2 within the apparatus 1 in a continuous stream and at high speed.

By minimizing the number of machines used to perform the different operations from the preforms 3 to filled, capped and labeled bottles 2, it is possible to achieve a relevant reduction of the footprint of the apparatus 1. Plus, by placing the capping machine 13 on the opposite side of the transfer line from the blow moulding carousel 20 to the filling carousel 24 with respect to the labeling unit 12, the footprint of the apparatus 1 may be further minimized.

Last but not least, by rotating the bottles 2 both. during the filling and the decompression steps, it is possible to reduce the formation of foam and therefore to increase the speed at which the bottles 2 are advanced by the filling carousel 24. In this way, the pitch of the filling carousel 24 may be increased and possibly made equal to that of the blow moulding carousel 20, so further simplifying the structure of the apparatus 1.

Clearly, changes may be made to apparatus described herein without, however, departing from the scope of protection as defined in the accompanying claims.

The invention claimed is:

1. An apparatus for producing capped and labelled plastic bottles, each of the plastic bottles having a longitudinal axis, a lateral wall, and a top neck substantially coaxial with the longitudinal axis, the apparatus comprising:
    a blow moulding machine comprising a blow moulding carousel rotating about a first vertical axis, the blow moulding carousel including:
        an input station for receiving a succession of preforms;
        an output station angularly spaced from the input station about the first vertical axis and releasing a succession of empty bottles; and
        a plurality of moulding units equally spaced angularly about the first vertical axis along a peripheral portion of the blow moulding carousel, wherein the moulding units are configured to be moved by the blow moulding carousel along a transfer path extending about the first vertical axis and through the input and output stations;
    a filling machine including:
        a filling carousel rotating about a second vertical axis, parallel to the first vertical axis, the filling carousel rotating in a direction opposite the blow molding carousel; and
        a plurality of filling devices, wherein each of the filling devices is configured to introduce a predetermined volume of a pourable product into a respective plastic bottle,
        wherein the filling carousel is configured to:
            receive the succession of empty bottles from the output station of the blow moulding machine at a first input station;
            transport the succession of empty bottles along a circular transfer path;
            receive a succession of labels at a second input station, arranged downstream and, angularly spaced from the first input station about the second vertical axis; and
            release a succession of filled and labelled bottles at a second output station, arranged downstream and angularly spaced from the first input station and the second input station about the second vertical axis;
    a conveying system configured to transfer the plastic bottles within the apparatus, the conveyor system defining a flow line that forms a distance between the blow moulding carousel and the filling carousel without further processing carousels;
    a pressurization circuit including a valve for activating the pressurization circuit, wherein the pressurization circuit is configured to pressurize each of the succession of empty bottles prior to labelling and filling;
    a labelling unit configured to label the succession of empty bottles pressurized by the pressurization circuit, wherein the labelling unit is arranged downstream of the first input station on the filling carousel;
    an actuating device configured to rotate each labelled bottle about the longitudinal axis during filling by a respective one of the filling devices and during transport along the circular transport path by the filling carousel, thereby generating centrifugal force and additional pressure for entrapping gas in the pourable product and prevent foaming of the pourable product;
    a decompression circuit configured to decompress labelled and fined bottles, wherein the actuating device is configured to rotate each of the labelled and filled bottles during decompression, thereby reducing foaming upon release from the respective one of the filling devices at atmospheric pressure;
    a capping machine located downstream of the filling machine and configured to cap the labelled and filled bottles, the capping machine including a capping carousel rotating about a third vertical axis, parallel to the first and second vertical axes, wherein the capping carousel is positioned opposite the flow line from the labelling unit; and
    a central electronic control system including an electronic process control unit configured to monitor and control operations of the blow moulding machine, the filling machine, the labelling unit, the capping machine, and the conveying system.

2. The apparatus as claimed in claim 1, wherein the conveying system including a plurality of consecutive transport star wheels transferring the bottles in a continuous stream from the blow moulding carousel to the filling carousel.

3. The apparatus as claimed in claim 1, wherein the labelling unit is arranged adjacent to a first sector of the filling carousel immediately downstream of a location at which the bottles are fed to the filling carousel by transport star wheels of the conveying system.

4. The apparatus as claimed in claim 1, wherein the succession of empty bottles are advanced from the blow moulding carousel to the filling carousel along a given flow path, and wherein the blow moulding machine, the filling machine, and the labelling unit have control panels located on the same side with respect to the flow path.

5. The apparatus as claimed in claim 1, wherein the distance to the filling carrousel from the blow moulding carousel is defined by the number of transport star wheels interposed therebetween.

6. The apparatus as claimed in claim 1, wherein the capping machine is connected to the filling machine by at least one transport star wheel.

7. The apparatus as claimed in claim 6, wherein the bottles are advanced from the blow moulding carousel to the filling carousel along a given flow path, and wherein the capping machine is arranged on the opposite side of the flow path with respect to the labelling unit.

8. The apparatus as claimed in claim 1, wherein:
    the pressurization circuit is selectively in communication with each of the succession of empty bottles advanced by the filling carousel to feed an operative fluid, pressurized at a pressure higher than the atmospheric pressure, into each bottle;
    the decompression circuit is selectively in communication with each of the labelled and filled bottles advanced by the filling carousel to discharge excess pressure with respect to the atmospheric pressure, after completion of the filling of each bottle with the pourable product;
    the actuating device is selectively switched to an active state to rotate each labelled bottle about the longitudinal axis during transport by the filling carousel;
    a filling machine control panel is configured to control activation/deactivation of each filling device and the actuating device, and connection of the pressurization circuit and the decompression circuit with each bottle; and
    the filling machine control panel is configured to simultaneously maintain the actuating, device in the active state while the decompression circuit is in communication with each labelled and filled bottle so as to rotate each of the labelled and filled bottles about the longitudinal axis during decompression.

9. The apparatus as claimed in claim 8, wherein the control device is configured to maintain the actuating device in the active state while one of the filling devices is activated so as to rotate each labelled bottle about the longitudinal axis during filling with the pourable product.

10. The apparatus as claimed in claim 8, wherein the actuating device is controlled by the control device to decelerate the labelled and filled bottles during decompression.

11. The apparatus as claimed in claim 1, further comprising a plurality of handling units configured to receive the succession of empty bottles from the blow moulding carousel and retain the succession of empty bottles during filling with the pourable product.

12. The apparatus as claimed in claim 11, wherein the labelling unit is arranged peripherally to the filling carousel and is configured to feed the succession of labels to the plurality of handling units carrying the succession of empty bottles.

13. The apparatus as claimed in claim 11, wherein each of the handling units includes a support device configured to receive and retain the succession of empty bottles in a vertical position.

14. The apparatus as claimed in claim 1, wherein each of the filling devices includes a vertical hollow post with a cylindrical shape and a shutter configured to engage the vertical hollow post with the filling device in a sliding manner.

15. The apparatus as claimed in claim 13, wherein the support device includes a support bell and a gripping member projecting downwards from the support bell, wherein the gripping member is configured to retain each of the succession of empty bottles by the top neck.

16. The apparatus as claimed in claim 1, wherein the actuating device includes an electric motor fixed to the filling carousel, wherein an activation of the electric motor is configured to rotate each labelled bottle about the longitudinal aids during filling.

17. The apparatus as claimed in claim 1, wherein the labeling unit includes a label transfer drum configured to carry the succession of labels on an outer lateral surface of the label transfer drum by suction.

18. The apparatus as claimed in claim 17, wherein the label transfer drum is arranged tangentially to the filling carousel so as to transfer each of the succession of labels to a respective bottle passing the label transfer drum.

19. The apparatus as claimed in claim 2, wherein the conveying system includes an even number of consecutive transport star wheels from the blow moulding carousel to the filling carousel.

* * * * *